US012657678B2

(12) United States Patent
Nitto

(10) Patent No.: US 12,657,678 B2
(45) Date of Patent: Jun. 16, 2026

(54) IMAGE PROCESSING APPARATUS AND CONTROL METHOD

(71) Applicant: CANON KABUSHIKI KAISHA, Tokyo (JP)

(72) Inventor: Yuuichi Nitto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 18/297,811

(22) Filed: Apr. 10, 2023

(65) Prior Publication Data

US 2023/0410274 A1 Dec. 21, 2023

(30) Foreign Application Priority Data

Jun. 15, 2022 (JP) ................................. 2022-096752

(51) Int. Cl.
*G06T 7/00* (2017.01)

(52) U.S. Cl.
CPC ........ G06T 7/0002 (2013.01); *G06T 2200/24* (2013.01); *G06T 2207/20081* (2013.01); *G06T 2207/20092* (2013.01); *G06T 2207/30184* (2013.01)

(58) Field of Classification Search
CPC .................................................. G06T 7/0002
See application file for complete search history.

(56) References Cited

U.S. PATENT DOCUMENTS

| | | | | |
|---|---|---|---|---|
| 9,189,876 B2* | 11/2015 | Ubillos | ............... | G06F 3/04845 |
| 2011/0261190 A1* | 10/2011 | Nakagaki | ................ | H01J 37/28 |
| | | | | 348/126 |
| 2013/0140457 A1* | 6/2013 | Minekawa | ............. | G01N 23/22 |
| | | | | 250/307 |
| 2020/0279111 A1* | 9/2020 | Takayama | ............. | G06T 7/0004 |
| 2021/0271913 A1 | 9/2021 | Nogami | | |
| 2022/0269996 A1 | 8/2022 | Nogami | | |

FOREIGN PATENT DOCUMENTS

| | | |
|---|---|---|
| JP | 2018-142352 A | 9/2018 |
| JP | 6675594 B2 | 4/2020 |
| JP | 2020-154467 A | 9/2020 |
| JP | 2021-081793 A | 5/2021 |
| WO | 2021/095693 A1 | 5/2021 |

OTHER PUBLICATIONS

Ferguson et al, "Detection and segmentation of manufacturing defects with convolutional neural networks and transfer learning"), Smart and sustainable manufacturing systems, pp. 1-16, Oct. 2018 (Year: 2018).*

(Continued)

*Primary Examiner* — Edward Park
(74) *Attorney, Agent, or Firm* — Venable LLP

(57) ABSTRACT

An image processing apparatus presents a result of performing defect detection on an image captured of an inspection target as case information. The apparatus comprises an acquisition unit that acquires the case information according to first information including an image on which the defect detection is to be performed and a presentation unit that presents the case information acquired by the acquisition unit.

15 Claims, 13 Drawing Sheets

(56) References Cited

OTHER PUBLICATIONS

Shetty, "Vision-based inspection system employing computer vision & neural networks for detection of fractures in manufactured components", IEEE, pp. 1-6, Jan. 2019 (Year: 2019).*

Damacharla et al., "TLU-Net: A Deep Learning Approach for Automatic Steel Surface Defect Detection", ICAPAI, pp. 1-6, Jan. 2021 (Year: 2021).*

Nov. 20, 2023 European Official Action in European Patent Appln. No. 23165133.2.

Feb. 20, 2026 Japanese Official Action in Japanese Patent Appln. No. 2022-096752.

Feb. 24, 2026 European Official Action in European Patent Appln. No. 23165133.2.

* cited by examiner

F I G.   1
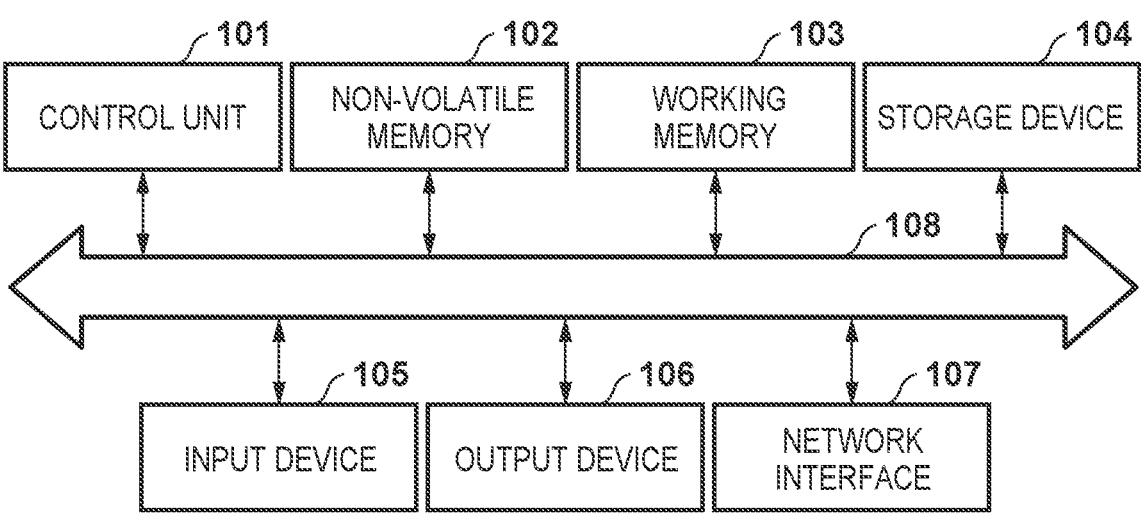

START

RECEIVE DEFECT DETECTION INFORMATION ~S301

ACQUIRE CASE INFORMATION ~S302

PRESENT CASE INFORMATION ~S303

DETECT DEFECT ~S304

REGISTER CASE INFORMATION ~S305

END 406        405

ORGANIZATION:A            USER:X

401~

IMAGE :    SELECT IMAGE   ~402

TYPE :    BRIDGE ▼   ~403

MEMBER :    FLOOR SLAB ▼   ~404

F I G.  5A

501A

| CASE ID | IMAGE | MODEL | PARA-METER | DETECTION RESULT | TYPE | MEMBER | DISCLOSURE SCOPE | SUITABI-LITY | DESCRIP-TION |
|---------|-------|-------|------------|------------------|------|--------|------------------|--------------|--------------|
| 502 | 503 | 504 | 505 | 506 | 507 | 508 | 509 | 510 | 511 |
| C0001 | IMG0001. jpg | MODEL 001 | 3,3,3 | DET0001. dat | BRIDGE | FLOOR SLAB | USER X | 5 | |
| C0002 | IMG0002. jpg | MODEL 001 | 3,5,3 | DET0002. dat | BRIDGE | PIER | ORGANIZATION A | 4 | |
| C0003 | IMG0003. jpg | MODEL 002 | 4,3,3 | DET0003. dat | TUNNEL | WALL SURFACE | GENERAL DISCLOSURE | 2 | |
| ... | ... | ... | ... | ... | ... | ... | ... | ... | ... |
| C0100 | IMG0100. jpg | MODEL 004 | 1,1,1 | DET0100. dat | ROAD | ROAD SURFACE | ORGANIZATION B | 1 | |

F I G. 5B

501B

| CASE ID | IMAGE | MODEL | PARA-METER | DETECTION RESULT | TYPE | MEMBER | DISCLOSURE SCOPE | SUITABI-LITY | DESCRIP-TION |
|---|---|---|---|---|---|---|---|---|---|
| C0101 | IMG0101.jpg | MODEL 001 | 3,3,3 | DET0101.dat | BRIDGE | FLOOR SLAB | USER Y | 5 | |
| C0102 | IMG0102.jpg | MODEL 001 | 5,5,5 | DET0102.dat | BRIDGE | FLOOR SLAB | ORGANIZATION B | 4 | |
| C0103 | IMG0103.jpg | MODEL 002 | 4,3,3 | DET0103.dat | BRIDGE | FLOOR SLAB | GENERAL DISCLOSURE | 3 | |
| C0104 | IMG0104.jpg | MODEL 004 | 1,1,1 | DET0104.dat | BRIDGE | PIER | ORGANIZATION A | 1 | |
| C0105 | IMG0105.jpg | MODEL 001 | 3,3,3 | DET0105.dat | BRIDGE | PIER | GENERAL DISCLOSURE | 5 | |
| ... | ... | ... | ... | ... | ... | ... | ... | ... | ... |

502  503  504  505  506  507  508  509  510  511

512    513

F I G. 5C

501C

| CASE ID (502) | IMAGE (503) | MODEL (504) | PARA-METER (505) | DETECTION RESULT (506) | TYPE (507) | MEMBER (508) | DISCLOSURE SCOPE (509) | SUITABILITY (510) | DESCRIPTION (511) |
|---|---|---|---|---|---|---|---|---|---|
| C0201 | IMG0201.jpg | MODEL 001 | 3, 3, 3 | DET0201.dat | BRIDGE | FLOOR SLAB | ORGANIZATION A | 5 | SUITABLE FOR DETECTING DEFECT OF BRIDGE/FLOOR SLAB |
| C0202 | IMG0202.jpg | MODEL 001 | 3, 3, 3 | DET0202.dat | DAM | WALL SURFACE | ORGANIZATION A | 1 | |
| C0203 | IMG0203.jpg | MODEL 001 | 1, 1, 1 | DET0203.dat | BRIDGE | PIER | GENERAL DISCLOSURE | 4 | |
| C0204 | IMG0204.jpg | MODEL 001 | 5, 3, 3 | DET0204.dat | BRIDGE | FLOOR SLAB | ORGANIZATION A | 5 | |
| C0205 | IMG0205.jpg | MODEL 001 | 3, 3, 3 | DET0205.dat | BUILDING | WALL SURFACE | GENERAL DISCLOSURE | 3 | |
| C0206 | IMG0206.jpg | MODEL 002 | 3, 3, 3 | DET0206.dat | ROAD | ROAD SURFACE | GENERAL DISCLOSURE | 5 | |
| C0207 | IMG0207.jpg | MODEL 003 | 3, 3, 3 | DET0207.dat | BUILDING | WALL SURFACE | GENERAL DISCLOSURE | 4 | |
| ... | ... | ... | ... | ... | ... | ... | ... | ... | ... |

515  516  517  518

F I G. 7A

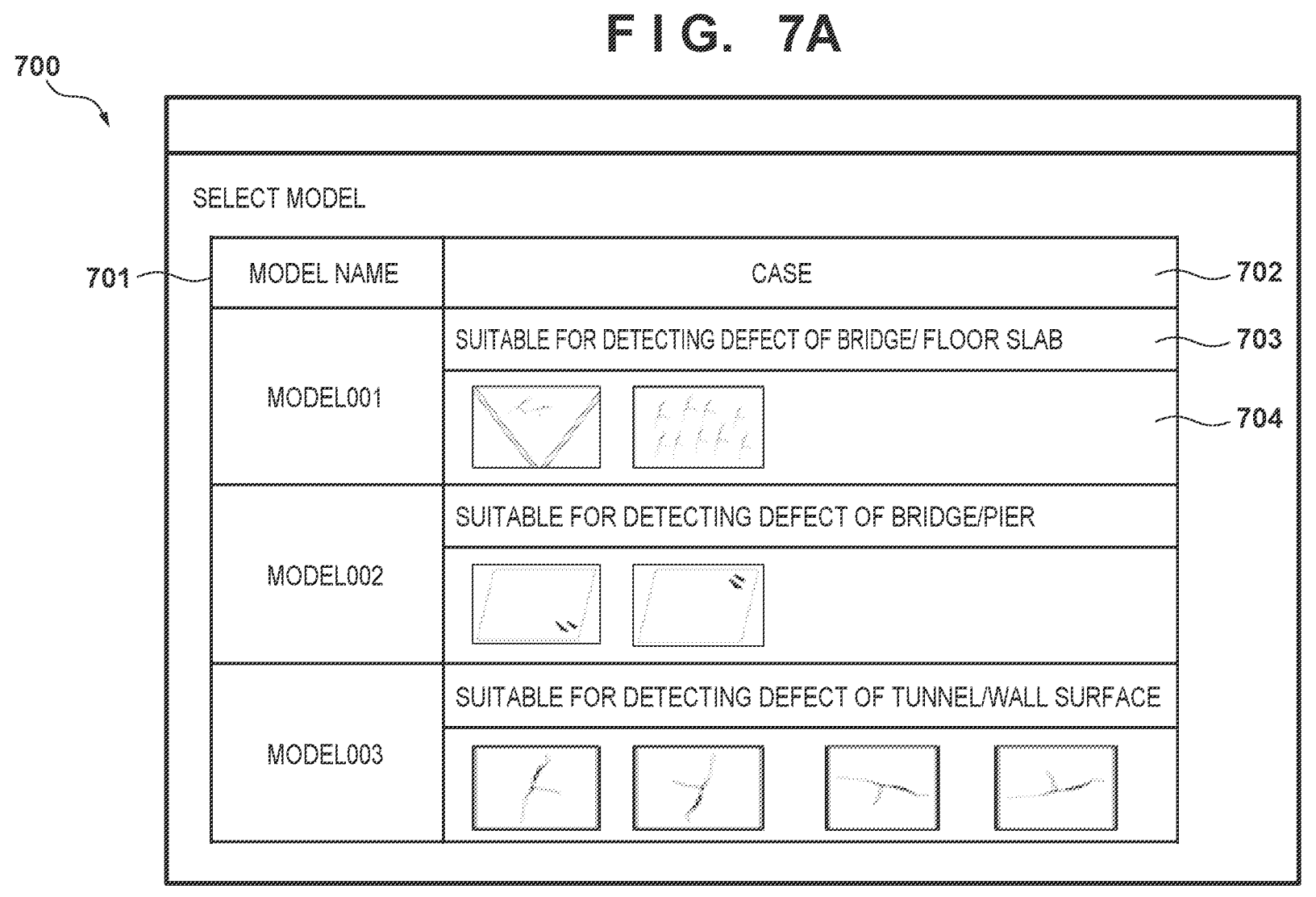

| MODEL NAME | CASE |
|---|---|
| MODEL001 | SUITABLE FOR DETECTING DEFECT OF BRIDGE/ FLOOR SLAB |
| MODEL002 | SUITABLE FOR DETECTING DEFECT OF BRIDGE/PIER |
| MODEL003 | SUITABLE FOR DETECTING DEFECT OF TUNNEL/WALL SURFACE |

SELECT MODEL

MODEL : MODEL001 ～710

DETECTION
RESULT EXAMPLE

PARAMETER SETTING ～711

NUMBER OF
DETECTIONS    1    2    3    4    5

CONTINUITY    1    2    3    4    5

NOISE
REDUCTION    1    2    3    4    5

712

SETTING
COMPLETION ～715

MODEL : MODEL001 ～710

DETECTION
RESULT EXAMPLE

PARAMETER SETTING ～713

NUMBER OF
DETECTIONS    1    2    3    4    5

CONTINUITY    1    2    3    4    5

NOISE
REDUCTION    1    2    3    4    5

714

SETTING
COMPLETION ～715

F I G. 7D
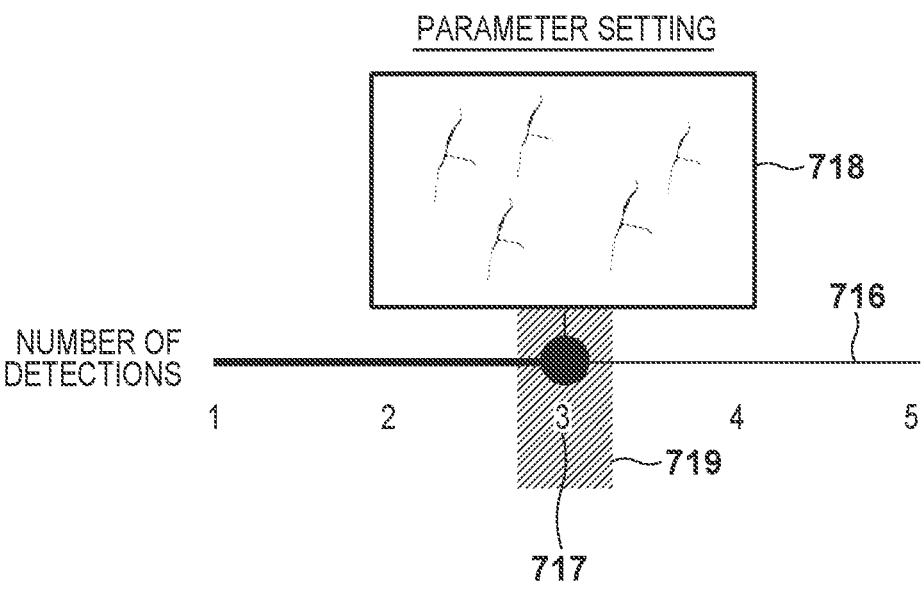
F I G. 7E
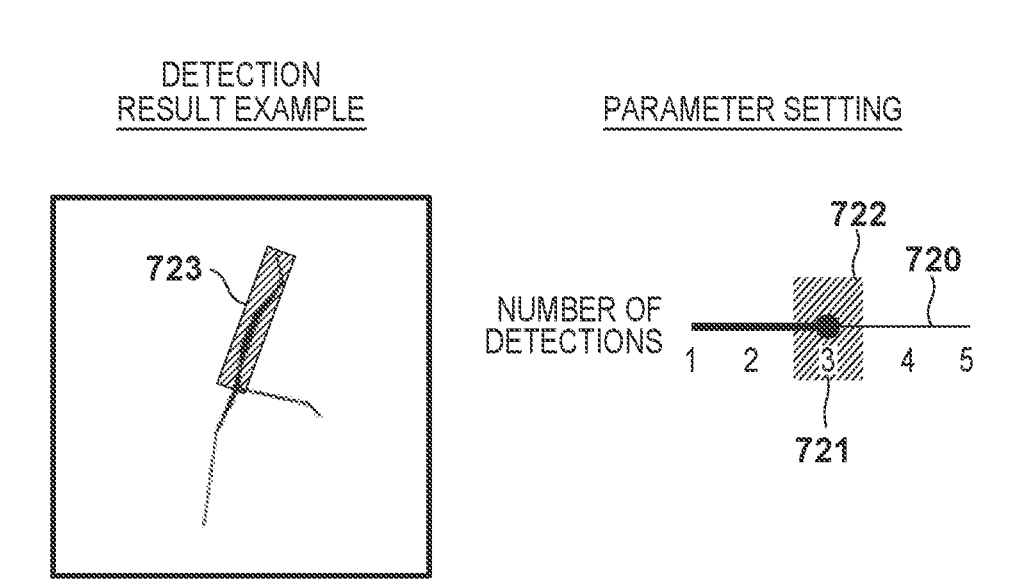

FIG. 8

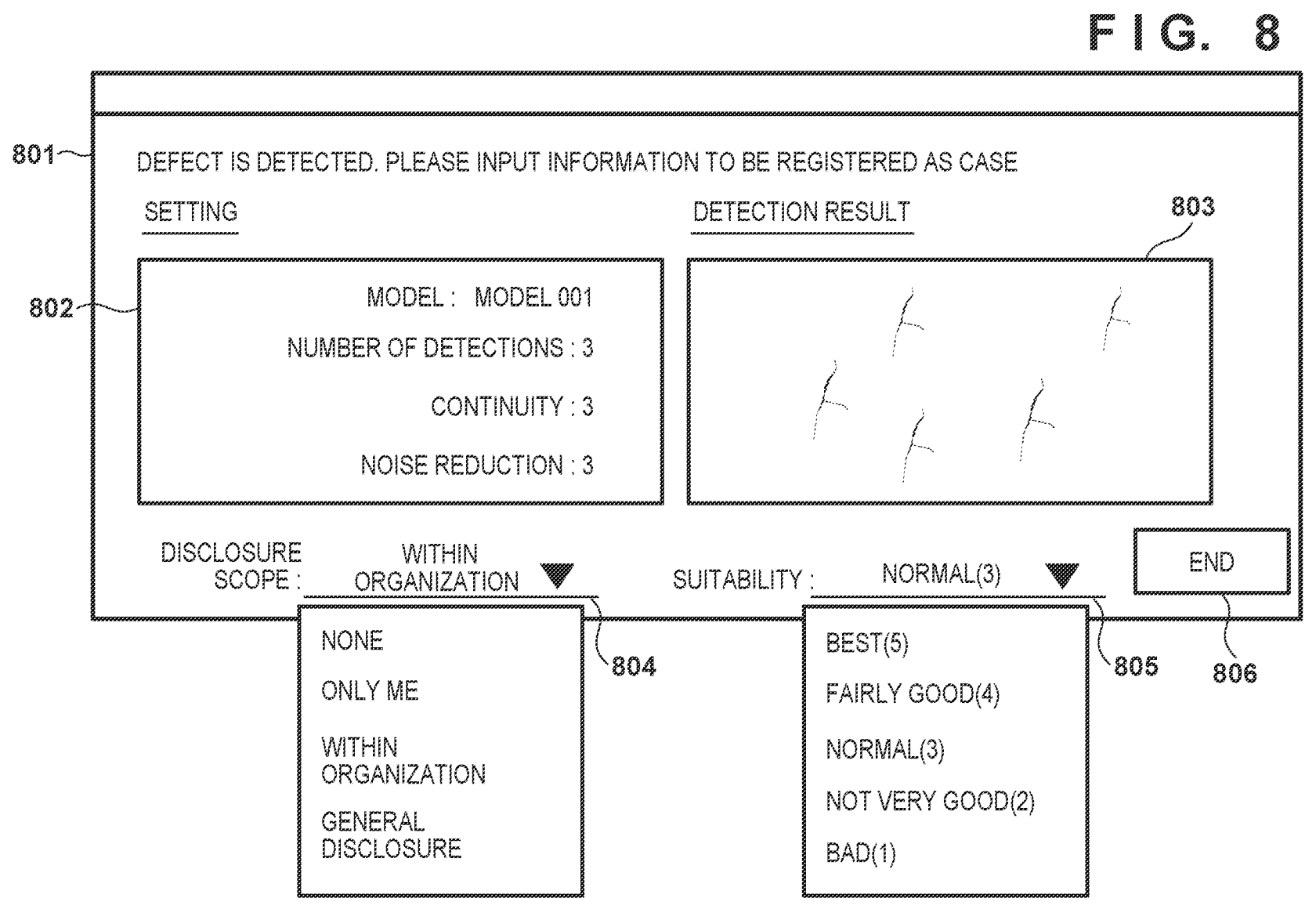

DEFECT IS DETECTED. PLEASE INPUT INFORMATION TO BE REGISTERED AS CASE

SETTING

DETECTION RESULT

MODEL : MODEL 001

NUMBER OF DETECTIONS : 3

CONTINUITY : 3

NOISE REDUCTION : 3

DISCLOSURE SCOPE :

WITHIN ORGANIZATION

NONE

ONLY ME

WITHIN ORGANIZATION

GENERAL DISCLOSURE

SUITABILITY :

NORMAL(3)

BEST(5)

FAIRLY GOOD(4)

NORMAL(3)

NOT VERY GOOD(2)

BAD(1)

END

| CASE ID | IMAGE | MODEL | PARA-METER | DETECTION RESULT | TYPE | MEMBER | DISCLOSURE SCOPE | SUITABI-LITY | DESCRIP-TION |
|---|---|---|---|---|---|---|---|---|---|
| | 502 | 503 | 504 | 505 | 506 | 507 | 508 | 509 | 510 | 511 |
| C01001 | IMG01001.jpg | MODEL 001 | 3,3,3 | DET01001.dat | BRIDGE | FLOOR SLAB | ORGANIZATION A | 5 | |
| C01002 | IMG01002.jpg | MODEL 001 | 3,3,5 | DET01002.dat | BRIDGE | FLOOR SLAB | ORGANIZATION A | 4 | |
| C01003 | IMG01003.jpg | MODEL 001 | 4,3,3 | DET01003.dat | BRIDGE | FLOOR SLAB | GENERAL DISCLOSURE | 2 | |
| C01004 | IMG01004.jpg | MODEL 001 | 1,1,1 | DET01004.dat | BRIDGE | FLOOR SLAB | USER X | 1 | |
| C01005 | IMG01005.jpg | MODEL 001 | 3,3,3 | DET01005.dat | BRIDGE | FLOOR SLAB | USER X | 5 | |
| ... | ... | ... | ... | ... | ... | ... | ... | ... | ... |

901

902

IMAGE PROCESSING APPARATUS AND CONTROL METHOD

BACKGROUND OF THE INVENTION

Field of the Invention

The present invention relates to techniques for detecting defects from images captured of an inspection target.

Description of the Related Art

There is a method applied, in the inspection of infrastructure, as a technique for detecting defects from images captured of an inspection target, that involves performing image processing using a learned model generated by machine learning with AI (artificial intelligence) or by deep learning, which is a type of machine learning. In order to accurately detect defects in this case, it is desirable to set an optimal model for the images to be processed and to adjust the parameters.

On the other hand, image processing for detecting defects from images captured of an inspection target requires images captured in high definition, and setting and processing are repeatedly performed until a desired result is obtained. Since the size of images captured at the resolution required in image processing is thus extremely large, processing takes time and finding the appropriate settings while repeatedly performing setting and processing takes time and effort.

Japanese Patent No. 6675594 describes a method in which case examples and settings of image processing performed for image correction are recorded in combination, and the case examples and settings of image processing are presented so as to be selectable.

With Japanese Patent No. 6675594, the user needs to select a case example to serve as a target, from among the presented case examples of image processing. However, the user may have difficultly determining and selecting an optimal case example simply by viewing images to be processed, detection results and the like with regard to image processing for performing defect detection using a learned model and parameters.

SUMMARY OF THE INVENTION

The present invention has been made in consideration of the aforementioned problems, and realizes techniques for making it easier than before to perform optimal settings for image processing executed for defect detection.

In order to solve the aforementioned problems, the present invention provides an image processing apparatus which presents a result of performing defect detection on an image captured of an inspection target as case information, comprising: an acquisition unit configured to acquire the case information according to first information including an image on which the defect detection is to be performed; and a presentation unit configured to present the case information acquired by the acquisition unit.

In order to solve the aforementioned problems, the present invention provides a method of controlling an image processing apparatus which presents a result of performing defect detection on an image captured of an inspection target as case information, the method comprising: acquiring the case information based on first information including an image on which the defect detection is to be performed; and presenting the case information acquired based on the first information.

In order to solve the aforementioned problems, the present invention provides a non-transitory computer-readable storage medium storing a program that causes a computer to execute a method of controlling an image processing apparatus which presents a result of performing defect detection on an image captured of an inspection target as case information, the method comprising: acquiring the case information based on first information including an image on which the defect detection is to be performed; and presenting the case information acquired based on the first information.

According to the present invention, optimal settings for image processing for executing defect detection can be more easily performed than before.

Further features of the present invention will become apparent from the following description of exemplary embodiments (with reference to the attached drawings).

BRIEF DESCRIPTION OF THE DRAWINGS

FIG. 1 is a block diagram illustrating a hardware configuration of an image processing apparatus according to the present embodiment.

FIGS. 5A to 5C diagrams illustrating a data structure of case information according to the present embodiment.

FIGS. 7A to 7E diagrams illustrating UI screens for presenting case information.

FIG. 8 is a diagram illustrating a UI screen for registering case information.

FIG. 9 is a diagram illustrating a data structure of case information including newly registered case information.

DESCRIPTION OF THE EMBODIMENTS

Figure 2:
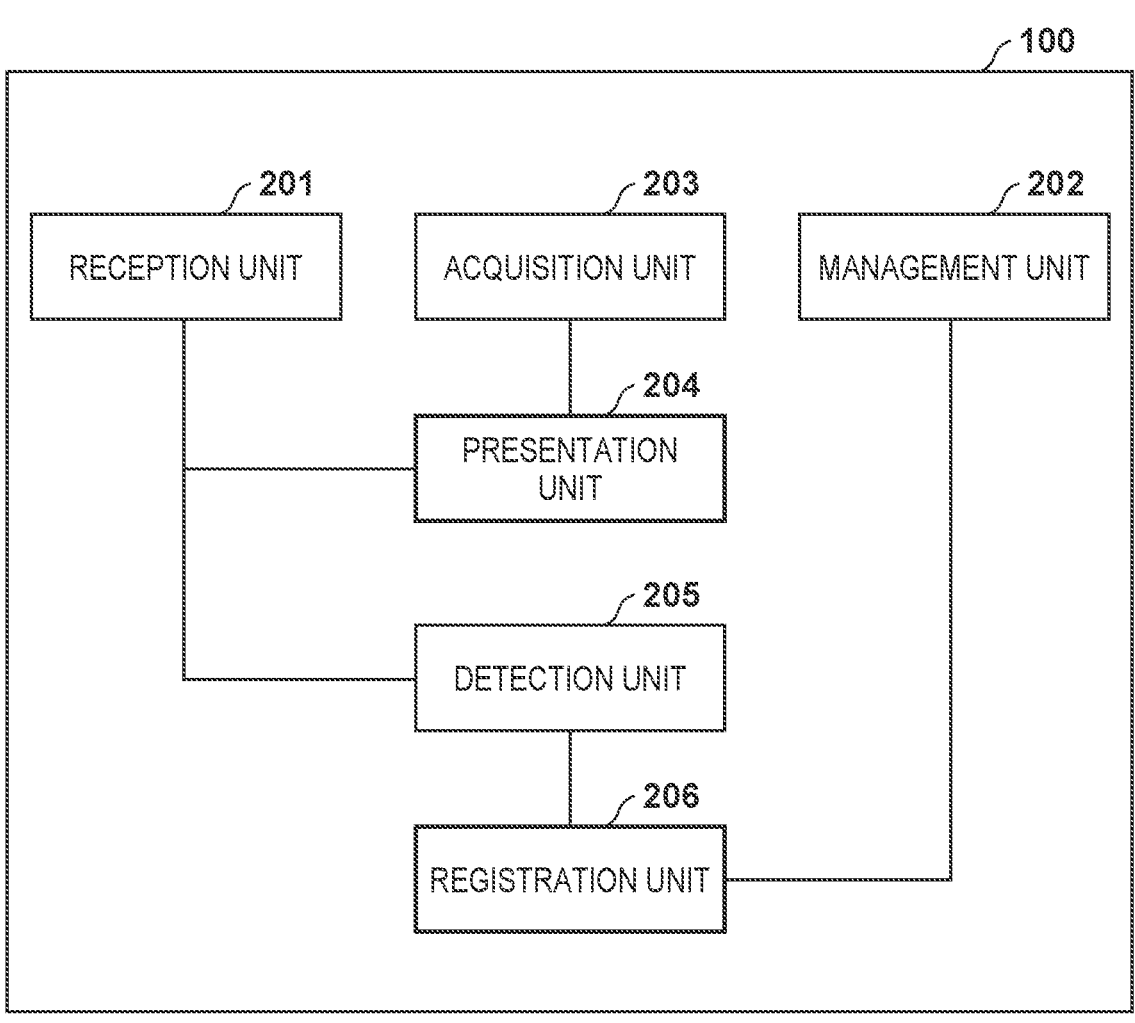
FIG. 2 is a functional block diagram of the image processing apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Hereinafter, an embodiment will be described in which an image processing apparatus according to the present invention is applied to a computer apparatus that is used in inspection of infrastructure such as concrete structures which are an example of an inspection target.

In the present embodiment, an example will be described in which, due to the computer apparatus operating as an image processing apparatus, and, presenting case information which is the result of defect detection processing performed previously, based on defect detection information (first information) that includes an image of the target on which defect detection is to be performed, it is possible to set image processing information (second information) that is used in image processing for performing defect detection.

Note that, in the present embodiment, the "inspection target" is a concrete structure that is to undergo inspection such as a motorway, bridge, tunnel, or dam. The image processing apparatus performs defect detection processing for detecting the presence and state of defects such as cracks using images captured of the inspection target by the user. Also, a "defect" is, in the case of a concrete structure, for example, cracking, heaving and flaking of the concrete. A "defect" also includes as other examples, efflorescence (crystalline deposit of salts), rebar exposure, rust, leakage, dripping, corrosion, damage (deficiency), cold joint, deposition, rock pocket, and the like.

Hardware Configuration

First, the hardware configuration of an image processing apparatus 100 according to the present embodiment will be described, with reference to FIG. 1.

FIG. 1 is a block diagram illustrating the hardware configuration of the image processing apparatus 100 according to the present embodiment.

Note that processing according to the embodiment that will be described below may be realized by a single computer apparatus, or may be realized by distributing the various functions between a plurality of computer apparatuses as necessary. The plurality of computer apparatuses are connected so as to be communicable each other.

The image processing apparatus 100 includes a control unit 101, a non-volatile memory 102, a work memory 103, a storage device 104, an input device 105, an output device 106, a network interface 107, and a system bus 108.

The control unit 101 includes a computational processor such as a CPU or MPU that performs overall control of the image processing apparatus 100. The non-volatile memory 102 is a ROM that stores models, parameters and programs that are executed by the processor of the control unit 101. Here, the programs are programs for executing control processing described later. Also, as will be described later, the models and parameters are learned models that are used in image processing for performing defect detection from images captured of an inspection target (hereinafter referred to as detection images), and parameters that are used in learning processing. The work memory 103 is a RAM that temporarily stores programs and data that are supplied from an external apparatus or the like.

The storage device 104 is an internal device such as a hard disk or memory card built into the image processing apparatus 100, or an external device such as a hard disk or memory card removably connected to the image processing apparatus 100. The storage device 104 includes a memory card, hard disk or the like constituted by a semiconductor memory, magnetic disk, or the like. Also, the storage device 104 includes a storage medium that is constituted by a disk drive that performs reading out of data from and writing of data to an optical disk such as a CD, DVD or Blu-ray® Disc.

The control unit 101 executes defect detection processing for detecting defects from detection images by image processing that uses a learned model and parameters. The learned model is, for example, generated by machine learning with AI (artificial intelligence) or by deep learning, which is a type of machine learning. The learned model can be constituted by a neural network model, for example. Note that the learning processing may be executed by a GPU (Graphics Processing Unit). The GPU is a processor capable of performing processing specialized for computer graphics calculations, and has computational processing capacity for performing matrix operations required in learning processing in a short time. Note that the learning processing is not limited to a GPU, and a circuit configuration that performs matrix operations required in a neural network need only be provided.

Note that the learned model and parameters that are used in image processing for detecting defects from images captured of the inspection target may be acquired from a cloud server or the like connected to a network via the network interface 107. Also, detection results obtained by transmitting detection images and parameters to the cloud server and executing image processing (inference processing) using a learned model on the cloud server may be acquired as case information via the network interface 107.

The input device 105 is an operation member such as a mouse, keyboard or touch panel that receives user operations, and outputs operation instructions to the control unit 101. The output device 106 is a display apparatus such as a display or monitor that is constituted by an LCD and organic EL, and displays data held by the image processing apparatus 100 or data supplied from an external device. The network interface 107 is connected to a network such as the Internet or a LAN (Local Area Network) so as to be communicable. The system bus 108 connects the constituent elements 101 to 107 of the image processing apparatus 100 so as to exchange data.

An OS (operating system) which is basic software that is executed by the control unit 101 and applications for realizing applied functions in cooperation with the OS are recorded on the non-volatile memory 102 or the storage device 104. Also, in the present embodiment, the non-volatile memory 102 or the storage device 104 store an application for the image processing apparatus 100 to realized image analysis processing for detecting defects from images captured of an inspection target described later.

The processing of the image processing apparatus 100 according to the present embodiment is realized by loading software that is provided by the application. Note that the application is assumed to have software for utilizing the basic functions of the OS installed on the image processing apparatus 100. Note that the OS of the image processing apparatus 100 may have software for realizing the processing according to the present embodiment.

Functional Configuration

Next, functional blocks of the image processing apparatus 100 according to the present embodiment will be described, with reference to FIG. 2.

FIG. 2 is a functional block diagram of the image processing apparatus 100 according to the present embodiment.

The image processing apparatus 100 includes a reception unit 201, a management unit 202, an acquisition unit 203, a presentation unit 204, a detection unit 205, and a registration unit 206. The functions of the image processing apparatus 100 are constituted by hardware and software. Note that the functional units may be constituted as a system constituted by one or a plurality of computer apparatuses and a server apparatus, and connected by a network.

The reception unit 201 receives defect detection information that includes image information of detection images and image processing information that is used in image processing from the storage device 104, the input device 105, an external server apparatus via the network interface 107, or the like.

The management unit 202 manages registration, deletion, updating and the like of case information that is stored in the storage device 104. Note that the case information is history information relating to settings, results and the like of defect detection processing previously executed.

The acquisition unit 203 acquires case information from the management unit 202 based on the defect detection information received by the reception unit 201.

The presentation unit 204 presents the case information acquired by the acquisition unit 203 to the user through display or the like.

The detection unit 205 executes processing for detecting defects from detection images based on the defect detection information and image processing information received by the reception unit 201.

The registration unit 206 registers the results of performing defect detection by the detection unit 205 as case information in the management unit 202.

Control Processing

Next, control processing according to the present embodiment will be described, with reference to FIGS. 3 to 9.

Figure 3:
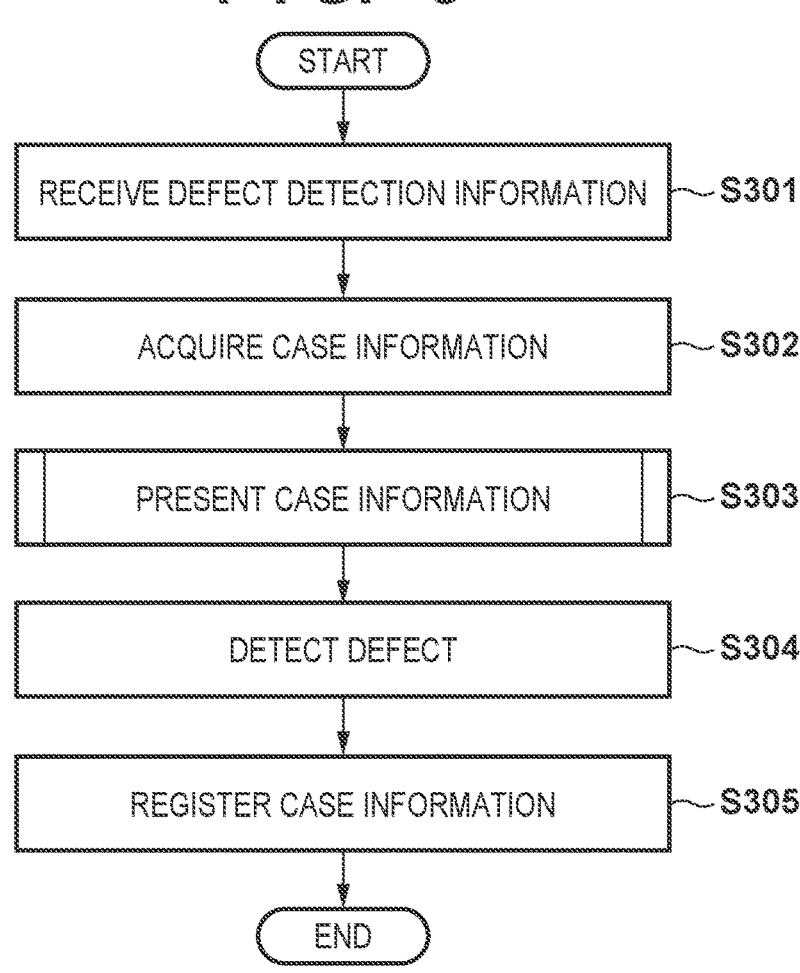
FIG. 3 is a flowchart illustrating control processing by the image processing apparatus according to the present embodiment.
Figure 4:
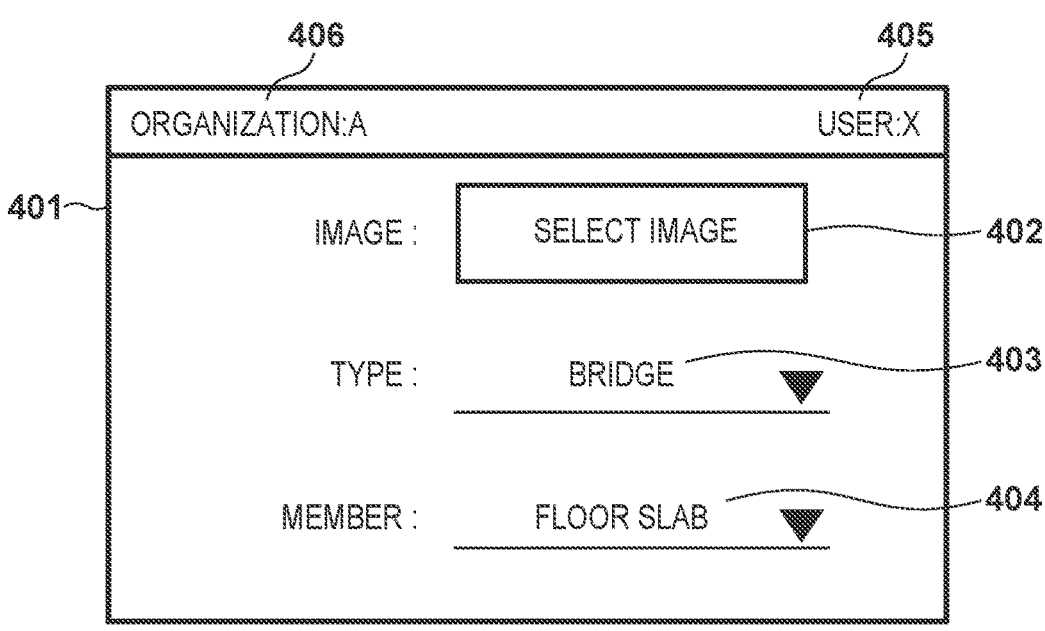
FIG. 4 is a diagram illustrating a UI screen for inputting defect detection information according to the present embodiment.

FIG. 3 is a flowchart illustrating control processing of the image processing apparatus 100 according to the present embodiment.

The processing of FIG. 3 is realized by the control unit 101 of the image processing apparatus 100 illustrated in FIG. 1 controlling the constituent elements illustrated in FIG. 1 to operate as the functional units illustrated in FIG. 2, by extracting and executing programs that are stored in the non-volatile memory 102 in the work memory 103. Also, the processing of FIG. 3 is started when the image processing apparatus 100 receives an instruction to start the defect detection processing with the input device 105.

In step S301, the reception unit 201 receives defect detection information. In this case, the user inputs the filename of a detection image to an image selection field 402 of a UI screen 401 illustrated in FIG. 4, by operating the input device 105, for example. The reception unit 201 receives a detection image that is stored in the storage device 104 via the management unit 202 based on the information input to the image selection field 402. Note that, apart from the image selection field 402, a type input field 403 and a member input field 404 for inputting the type and member of the structure serving as the inspection target are provided on the UI screen 401 illustrated in FIG. 4, allowing the user to input the type and member of the structure serving as the inspection target, as defect detection information. In this case, the reception unit 201 receives information on the type and member of the structure serving as the inspection target, in addition to the detection image input to the image selection field 402. Furthermore, apart from the image selection field 402, the type input field 403 and the member input field 404, a user input field 405 and an organization input field 406 for inputting the user who input the defect detection information and the organization to which the user belongs are provided on the UI screen 401 illustrated in FIG. 4, allowing the user to input identification information of the user and identification information of the organization as detection information. In this case, the reception unit 201 receives identification information of the user who input the defect detection information and identification information of the organization, in addition to the information input to the image selection field 402, the type input field 403, and the member input field 404. Note that the method of inputting the defect detection information is an example, and the input method is not limited to the input method using the UI screen 401 illustrated in FIG. 4.

In step S302, the acquisition unit 203 acquires case information that is stored in the storage device 104 via the management unit 202 based on the defect detection information received by the reception unit 201 in step S301. FIG. 5A illustrates the data structure of case information 501A that is stored in the storage device 104. In FIG. 5A, each record of the case information 501A is history information relating to the settings, results and the like of defect detection processing executed in the past. The history information includes a case ID 502, an image 503, a model 504, parameters 505, and a detection result 506, for example. Identification information that is assigned for each case example is registered in the case ID 502. The filename of the detection image is registered in the image 503. The name of the learned model used in image processing of the detection image and parameters used in the learning processing are registered as image processing information in the model 504 and the parameters 505. Defect information detected from the detection image is registered in the detection result 506.

Also, the history information includes attribute information such as a type 507 and a member 508 of the structure serving as the inspection target. Furthermore, the history information includes, as additional information, a disclosure scope 509 representing the scope of users to whom the case information is to be disclosed, a suitability 510 representing the level of suitability of the defect detection result, and a description field 511 for writing a description of the case information. Note that the information used in learning processing of the learning model in the defect detection processing may be registered in advance in the case information, or correct answer values, features and the like of the image 503, the detection result 506 and the like may be registered in the description field 511, based on the information used in the learning processing of the learning model.

The acquisition unit 203 acquires the information of all records of the case information 501A illustrated in FIG. 5A, or the information of the record corresponding to the defect detection information received by the reception unit 201 in step S301, or the information of the record selected based on the defect detection information. For example, in the case of receiving type "bridge" and member "floor slab" of the structure serving as the inspection target as defect detection information, the acquisition unit 203 acquires, from the case information 501B illustrated in FIG. 5B, case information 512 in which the type and member of the structure serving as the inspection target match the received type and member. Also, in the case of receiving user ID "X" and organization "A" of the structure serving as the inspection target as defect detection information, in addition to the type "bridge" and member "floor slab", the acquisition unit 203 acquires, from the case information 501B illustrated in FIG. 5B, case information 513 in which the type and member of the structure serving as the inspection target match the received type and member and the disclosure scope includes user ID "X". Furthermore, the acquisition unit 203 may acquire case information in which the detection image acquired as defect detection information and the EXIF information added to the detection image are similar to the image that is registered in the case information 501B illustrated in FIG. 5B and the EXIF information added to the image.

In step S303, the presentation unit 204 presents the detection images received by the reception unit 201 and the case information acquired by the acquisition unit 203 to the user. FIG. 5C illustrates part of case information 501C acquired by the acquisition unit 203 in step S302. The presentation processing of step S303 will be described later with FIG. 6.

In step S304, the detection unit 205 executes processing for detecting defects using a model and parameters of case information selected by the user from the case information 501C presented by the presentation unit 204 on the detection images received by the reception unit 201.

In step S305, the registration unit 206 registers the result of performing defect detection by the detection unit 205 as case information. In this case, the user can register the defect detection result by operating the input device 105 to input case information on a UI screen 801 illustrated in FIG. 8, for example. On the UI screen 801, the model and parameter settings used in the defect detection processing of step S304 can be input to a setting input field 802, and the input information is displayed. Defect information of the defect detection processing result of step S304 can be input to a detection result field 803, and the input defect information is displayed. Options for the scope for disclosing the case information to be registered are displayed in a disclosure scope field 804 so as to be selectable from a pull-down menu. Options for the suitability of the defect detection result of the case information to be registered are displayed in a suitability field 805 so as to be selectable from a pull-down menu. When the user operates a finish button 806, the case information input on the UI screen 801 of FIG. 8 is additionally registered in the case information 501A of FIG. 5A.

FIG. 9 illustrates case information 901 that includes case information 902 additionally registered in step S305. In the case information 902, newly generated identification information is registered in the case ID 502. Also, the detection image received by the reception unit 201 in step S301 (image input to the image selection field 402 of the UI screen 401 in FIG. 4) and the type and member of the structure serving as the inspection target are respectively registered in the image 503, the type 507, and the member 508. Also, the model and parameters used in the defect detection processing executed by the detection unit 205 in step S304 and the defect detection result are respectively registered in the model 504, the parameters 505, and the detection result 506. Furthermore, in step S305, the disclosure scope and suitability input on the UI screen 801 of FIG. 8 are respectively registered in the disclosure scope 509 and the suitability 510. Note that a configuration may be adopted in which the case information input on the UI screen 801 of FIG. 8 is not registered, in the case where "None" is selected as the option of the disclosure scope field 804 on the UI screen 801 of FIG. 8.

Processing for Presenting Case Information

Next, the processing for presenting case information in step S303 of FIG. 3 will be described, with reference to FIG. 6.

Figure 6:
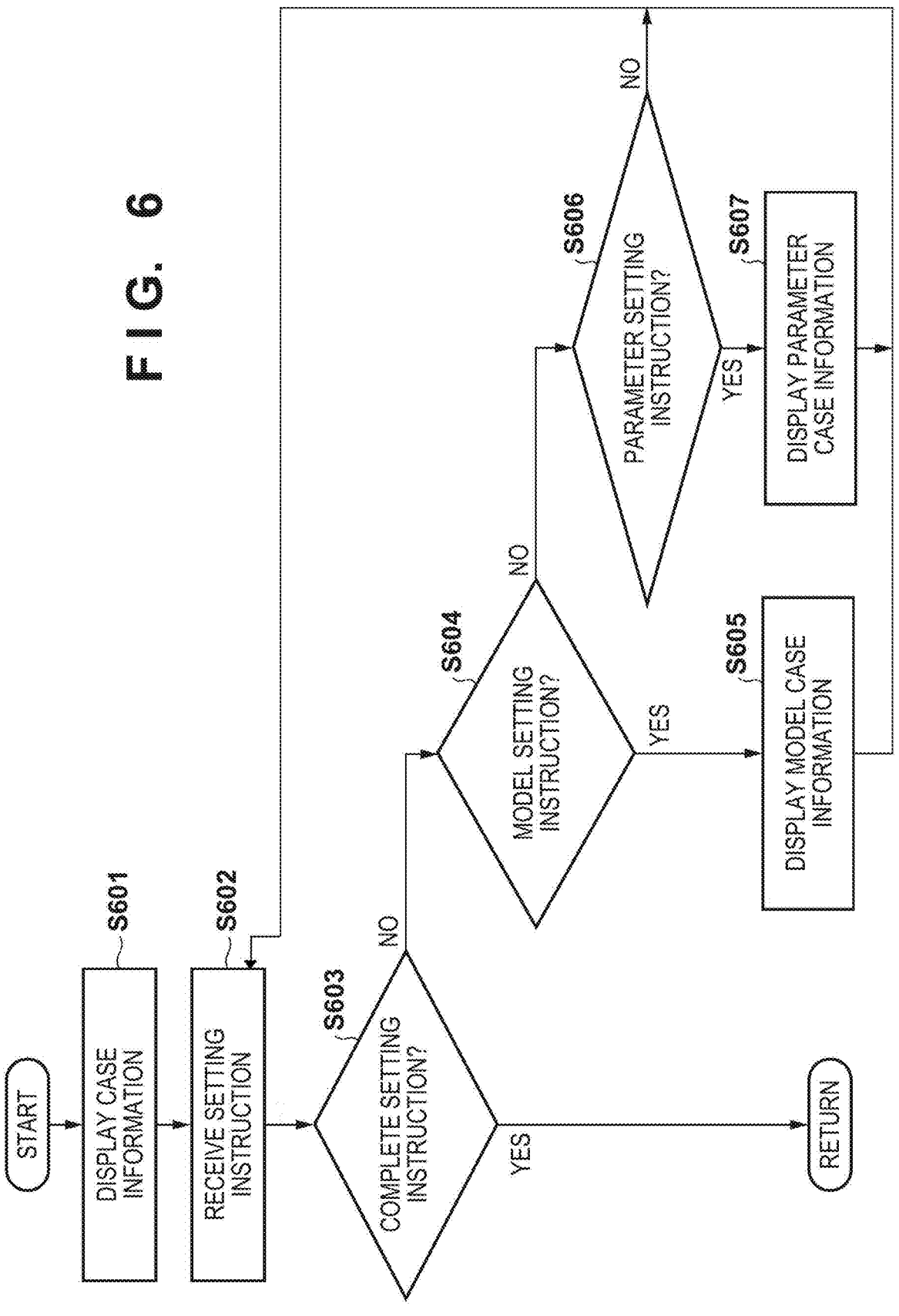
FIG. 6 is a flowchart illustrating processing for presenting case information according to the present embodiment.

FIG. 6 is a flowchart illustrating the processing for presenting case information of step S303 in FIG. 3. FIGS. 7A to 7E illustrate UI screens for presenting case information.

In step S601, the presentation unit 204 displays the case information acquired by the acquisition unit 203 in step S302 of FIG. 3 on the output device 106. The presentation unit 204 displays a case information list screen 700 illustrated in FIG. 7A, for example. On the case information list screen 700, model names 701 and case examples 702 that can be set in the defect detection processing that is executed by the detection unit 205 in step S304 of FIG. 3 are displayed in list form. In the case examples 702, a description 703 of the case example for each model and one or more images 704 of the case example are displayed. The description and images of the case example for each model are displayed as a set in the descriptions 703 of the case examples and the images 704 of the case examples. For example, the content contained in the description field 511 of case information 515 whose model name matches "model 001", among the case information 501C illustrated in FIG. 5C, is displayed in the description 703 of the case example. Similarly, thumbnails of the images registered in the image 503 of the case information 515 whose model name matches "model 001", among the case information 501C illustrated in FIG. 5C, are displayed in the image 704 of the case example. Note that a configuration may be adopted in which a model to be used in the defect detection processing that is executed by the detection unit 205 in step S304 of FIG. 3 can be set, by the user selecting a model name 701 on the case information list screen 700 illustrated in FIG. 7A.

Figure 7B:
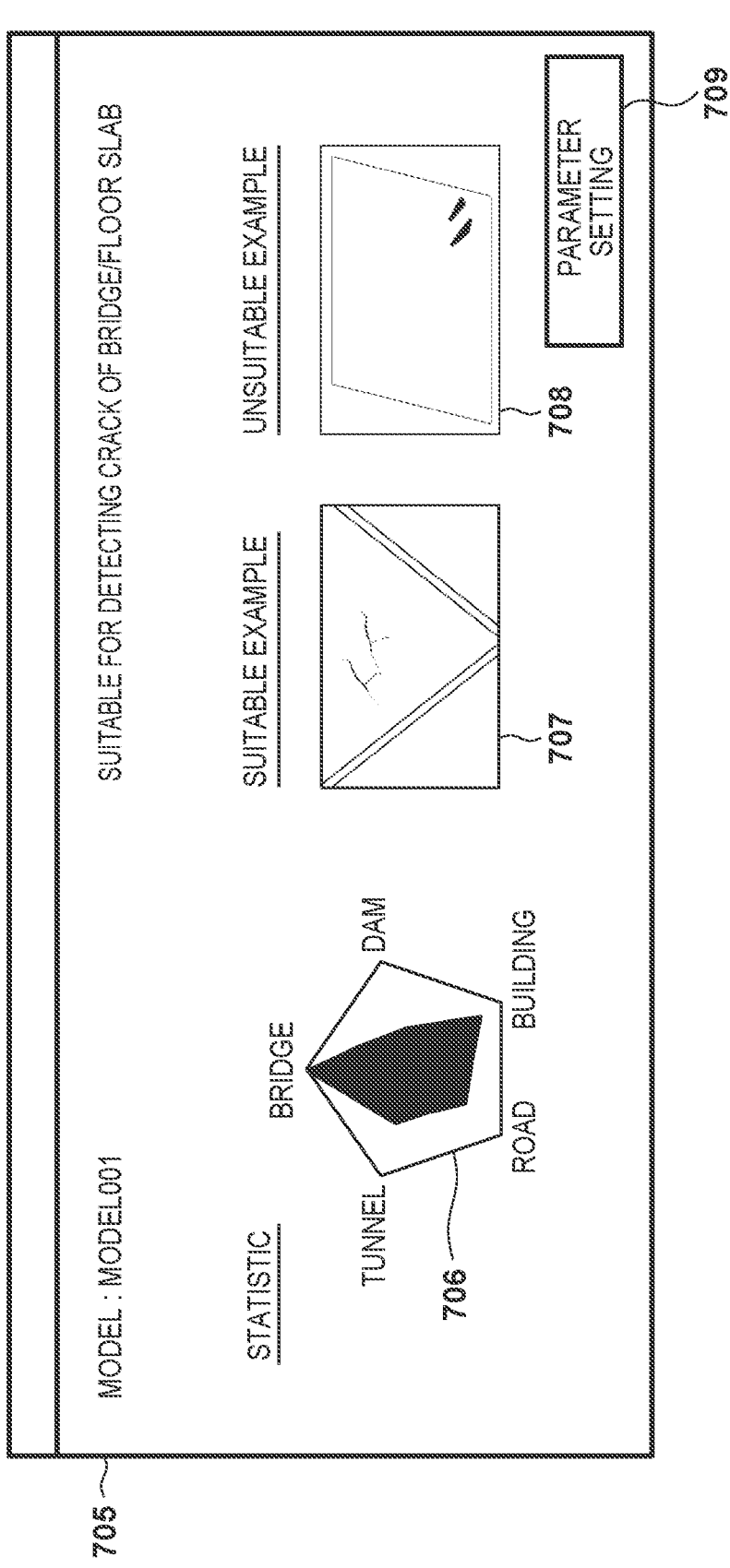
Figure 7C:
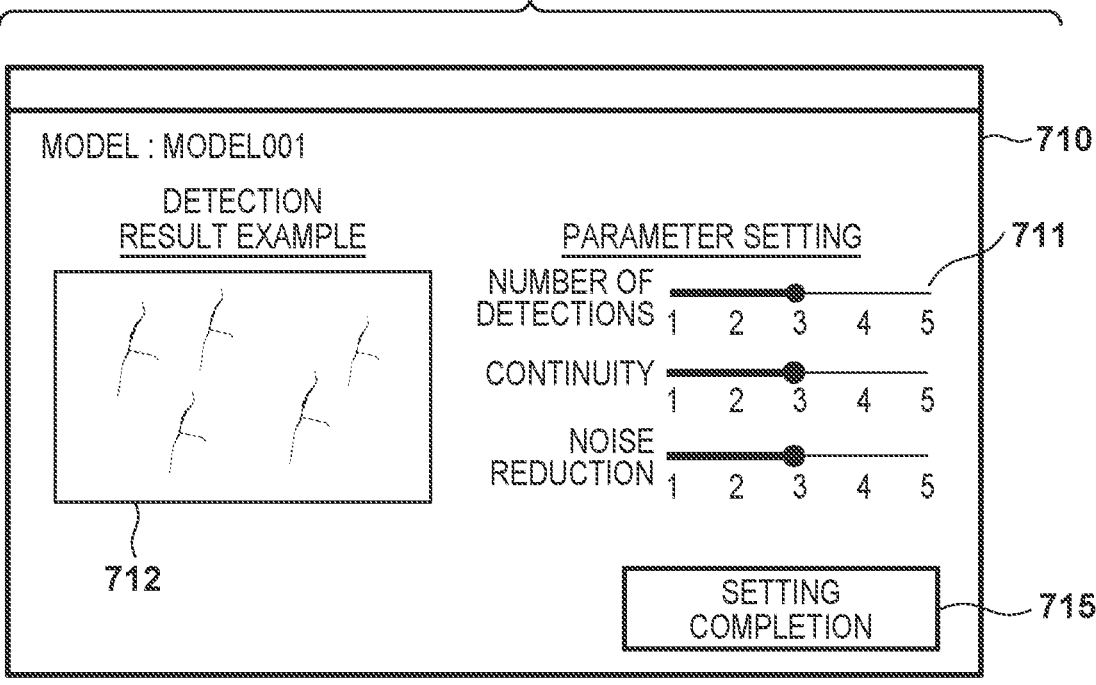
Figure 7C:
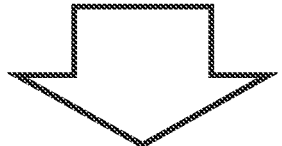
Figure 7C:
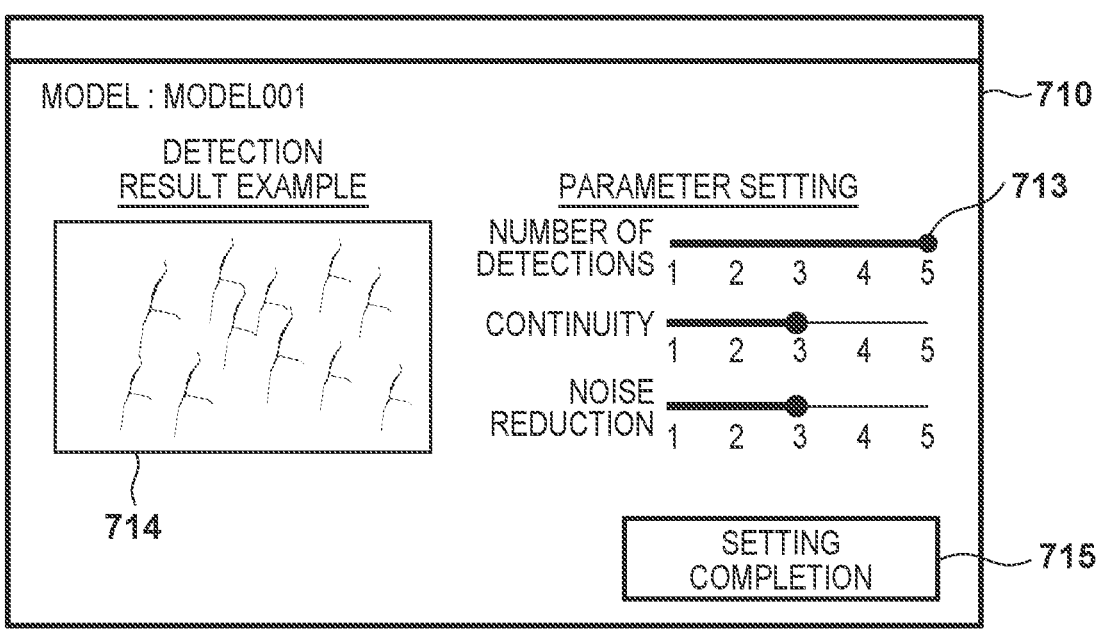

In step S602, the reception unit 201 receives an instruction to set the model or parameters to be used in the defect detection processing that is executed by the detection unit 205 in step S304 of FIG. 3, by operating the input device 105, on a model setting screen 705 illustrated in FIG. 7B or a parameter setting screen 710 illustrated in FIG. 7C, for example.

In step S603, the presentation unit 204 determines whether the setting instruction received by the reception unit 201 is a setting completion instruction. The presentation unit 204 ends the processing if the setting instruction received by the reception unit 201 is a setting completion instruction, and advances the processing to step S304 of FIG. 3. Also, the presentation unit 204 advances the processing to step S604 if the setting instruction received by the reception unit 201 is not a setting completion instruction.

In step S604, the presentation unit 204 determines whether the setting instruction received by the reception unit 201 is a model setting instruction. The presentation unit 204 advances the processing to step S605 if the setting instruction received by the reception unit 201 is a model setting instruction. The presentation unit 204 advances the processing to step S606 if the setting instruction received by the reception unit 201 is not a model setting instruction.

In step S605, the presentation unit 204 displays the case information of the model selected by the setting instruction (model setting) received by the reception unit 201 in step S602 on the output device 106. The presentation unit 204 displays the model setting screen 705 illustrated in FIG. 7B, for example. Statistics 706 for each structure serving as the inspection target on which the defect detection processing has been performed using the selected model, and a suitable example 707 and an unsuitable example 708 that indicate the suitability of the detection image are displayed on the model setting screen 705. A graph representing the frequency of each type of structure serving as the inspection target that is registered in the type 507 of the case information 515 whose model name matches "model 001", among the case information 501C illustrated in FIG. 5C, is displayed in the statistics 706. Also, the detection image and the detection result that are registered in the image 503 and the detection result 506 of the case information 516 whose model name matches "model 001" and whose suitability is the highest level 5, among the case information 501C illustrated in FIG. 5C, are displayed as the suitable example 707. Similarly, the detection image and detection result that are registered in the image 503 and the detection result 506 of the case information 517 whose model name matches "model 001" and whose suitability is the lowest level 1, out of among the case information 501C illustrated in FIG. 5C, are displayed as the unsuitable example 708. Note that a UI screen for the user to set parameters is displayed, by operating a set parameters button 709 on the model setting screen 705.

In step S606, the presentation unit 204 determines whether the setting instruction received by the reception unit 201 is a parameter setting instruction. The presentation unit 204 advances the processing to step S607 if the setting instruction received by the reception unit 201 is a parameter setting instruction. Also, the presentation unit 204 returns the processing to step S602 if the setting instruction received by the reception unit 201 is not a parameter setting instruction.

In step S607, the presentation unit 204 displays, on the output device 106, the case information of the parameters set by the setting instruction (parameter setting) received by the reception unit 201 in step S602, for the model selected in step S605. In this case, the presentation unit 204 displays the parameter setting screen 710 illustrated in FIG. 7C, for example. A plurality (three types) of sliders 711 that enable the parameters to be set individually and a detection result example 712 of the set model and parameters are displayed on the parameter setting screen 710. In the example in FIG. 7C, the parameters "3, 3, 3" are set with the sliders 711. In this case, the detection result that is registered in the detection result 506 of the case information 516 whose model name matches "model 001" and whose parameters match "3, 3, 3", out ofamong the case information 501C illustrated in FIG. 5C, is displayed as the detection result example 712. Next, in the case where parameters "5, 3, 3" are set with the sliders 713, the detection result that is registered in the detection result 506 of case information 518 whose model name matches "model 001" and whose parameters match "5, 3, 3", out of among the case information 501C illustrated in FIG. 5C, is displayed as a detection result example 714. Note that, in the case where there are a plurality of pieces of case information having matching parameters, among the case information 501C illustrated in FIG. 5C, the plurality of pieces of case information may be displayed. Furthermore, case information that matches the type or member of the structure serving as the inspection target received by the reception unit 201 in step S301, or case information having the highest level of suitability, out of the case information 501C illustrated in FIG. 5C, may be selected and displayed. Also, in the case where there is no case information whose parameters match among the case information 501C illustrated in FIG. 5C, the detection result of case information whose parameters are most similar to the parameters set on the parameter setting screen 710 of FIG. 7C, among the parameters that are registered in the parameters 505 of the case information 501C, may be displayed.

Note that, due to the user operating a setting completion button 715 on the parameter setting screen 710 of FIG. 7C with the input device 105, the presentation unit 204, in step S603, determines that setting completion of the parameters and model is instructed and ends the processing.

Also, as a method for presenting detection result examples that depend on the parameter settings, a configuration may be adopted in which detection result examples are presented in association with sliders for setting the parameters. For example, a detection result example 718 is displayed in a position corresponding to a parameter value 717 of a slider 716 for setting the parameter as illustrated in FIG. 7D. In this case, highlighting 719 may be performed so as to indicate that there is case information corresponding to the parameter value 717. Furthermore, highlighting 722 may be performed by performing coloring or the like of a parameter value 721 of a slider 720 for setting the parameter as illustrated in FIG. 7E. Additionally, the difference between the detection result corresponding to the parameter value 721 and the detection result corresponding to a parameter value smaller than the parameter value 721 may be extracted, and highlighting 723 may be performed by displaying the extracted region so as to be enlarged.

Note that the method of presenting case information in step S303 of FIG. 3 steps S601 to S607 of FIG. 6) is not limited to the case information list screen 700 of FIG. 7A, and the model setting screen 705 of FIG. 7B may be displayed in list form, or the parameter setting screen 710 of FIG. 7C may also be displayed together in step S605 of FIG. 6. Also, a configuration may be adopted in which the processing of any of step S601, step S605 and step S607 in FIG. 6 is not performed, or part of the UI screen is not displayed.

Also, in the present embodiment, an example in which case information acquired by the acquisition unit 203 is presented by the presentation unit 204 is described, but processing in which the acquisition unit 203 acquires case information and the presentation unit 204 presents the case information may be repeatedly performed each time the reception unit 201 receives defect detection information. As described above, according to the present embodiment, by presenting case information that depends on defect detection information input by the user, an optimal model and parameters can be set more easily than before, and detection processing can be performed efficiently while maintaining detection accuracy. As a result, it is possible to improve the reliability of defect detection by image processing, and to streamline inspection work.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-096752, filed Jun. 15, 2022 which is hereby incorporated by reference herein in its entirety.

What is claimed is:

1. An image processing apparatus which presents a result of performing defect detection on an image captured of an inspection target as case information, the image processing apparatus comprising:

a processor; and a memory, including instructions stored therein, which when executed by the processor cause the image processing apparatus to:

(1) acquire the case information according to first information including an image on which the defect detection is to be performed;

(2) present the acquired case information, wherein the case information includes (a) an image on which the defect detection has been performed and (b) second information used in image processing for performing the defect detection, and wherein the second information includes a learned model and a parameter which have been used in the image processing; and (3) present the learned model so as to be selectable and a parameter of a selected learned model so as to be settable, and (4) present a detection result example corresponding to a set value of the parameter of the selected learned model as the case information, wherein the learned model and parameters of the learned model are individually selectable, wherein a plurality of types of parameters are variably settable for a single learned model, wherein the detection result example is presented for each parameter variably settable for the single learned model, wherein the inspection target is a concrete structure, and wherein the defect includes at least one of cracking, heaving, and flaking of the concrete structure.

2. The image processing apparatus according to claim 1, wherein the instructions, when executed by the processor, further cause the image processing apparatus to receive the first information.

3. The image processing apparatus according to claim 2, wherein the first information includes an image on which the defect detection is to be performed and information on a structure serving as the inspection target.

4. The image processing apparatus according to claim 3, wherein the information on the structure serving as the inspection target includes a type and a member of the structure serving as the inspection target.

5. The image processing apparatus according to claim 1, wherein the case information further includes defect information obtained by the defect detection, and a type and a member of a structure serving as the inspection target.

6. The image processing apparatus according to claim 1, wherein the case information further includes a disclosure scope of the case information and a suitability of the case information.

7. The image processing apparatus according to claim 1, wherein the instructions, when executed by the processor, further cause the image processing apparatus to present an image on which defect detection has been performed using the learned model and a description of the learned model.

8. The image processing apparatus according to claim 1, wherein the instructions, when executed by the processor, further cause the image processing apparatus to present a suitability of a detection result of the image on which defect detection has been performed using a selected learned model and a statistic of a type of a structure serving as the inspection target.

9. The image processing apparatus according to claim 1, wherein the instructions, when executed by the processor, further cause the image processing apparatus to perform the defect detection based on the first information.

10. The image processing apparatus according to claim 9, wherein the instructions, when executed by the processor, further cause the image processing apparatus to register the result of performing the defect detection as the case information.

11. The image processing apparatus according to claim 10, wherein the instructions, when executed by the processor, further cause the image processing apparatus to register the disclosure scope of the case information and a suitability of the detection result of the case information.

12. The image processing apparatus according to claim 1, further comprising a slider for setting the parameter, wherein the instructions, when executed by the processor, further cause the image processing apparatus to (a) present the detection result example in a position corresponding to a parameter value set by the slider and (b) perform highlighting so as to indicate that there is case information corresponding to the set parameter value.

13. The image processing apparatus according to claim 1, wherein suitability of the defect detection of the case information is settable by a user visually confirming the presented detection result example.

14. A method of controlling an image processing apparatus which presents a result of performing defect detection on an image captured of an inspection target as case information, the method comprising:

acquiring the case information based on first information including an image on which the defect detection is to be performed;

presenting the acquired case information, wherein the case information includes (a) an image on which the defect detection has been performed and (b) second information used in image processing for performing the defect detection, and wherein the second information includes a learned model and a parameter which have been used in the image processing;

presenting the learned model so as to be selectable and a parameter of a selected learned model so as to be settable, and presenting a detection result example corresponding to a set value of the parameter of the selected learned model as the case information, wherein the learned model and parameters of the learned model are individually selectable, wherein a plurality of types of parameters are variably settable for a single learned model, wherein the detection result example is presented for each parameter variably settable for the single learned model, wherein the inspection target is a concrete structure, and wherein the defect includes at least one of cracking, heaving, and flaking of the concrete structure.

15. A non-transitory computer-readable storage medium storing a program that causes a computer to execute a method of controlling an image processing apparatus which presents a result of performing defect detection on an image captured of an inspection target as case information, the method comprising:

13 acquiring the case information based on first information including an image on which the defect detection is to be performed;

presenting the acquired case information, wherein the case information includes (a) an image on which the defect detection has been performed and (b) second information used in image processing for performing the defect detection, and wherein the second information includes a learned model and a parameter which have been used in the image processing;

presenting the learned model so as to be selectable and a parameter of a selected learned model so as to be settable, and presenting a detection result example corresponding to a set value of the parameter of the selected learned model as the case information, wherein the learned model and parameters of the learned model are individually selectable, wherein a plurality of types of parameters are variably settable for a single learned model, wherein the detection result example is presented for each parameter variably settable for the single learned model, wherein the inspection target is a concrete structure, and wherein the defect includes at least one of cracking, heaving, and flaking of the concrete structure.

\* \* \* \* \*